L. Bartlett.
Corn Planter.
No. 94,065. Patented Aug. 24, 1869.
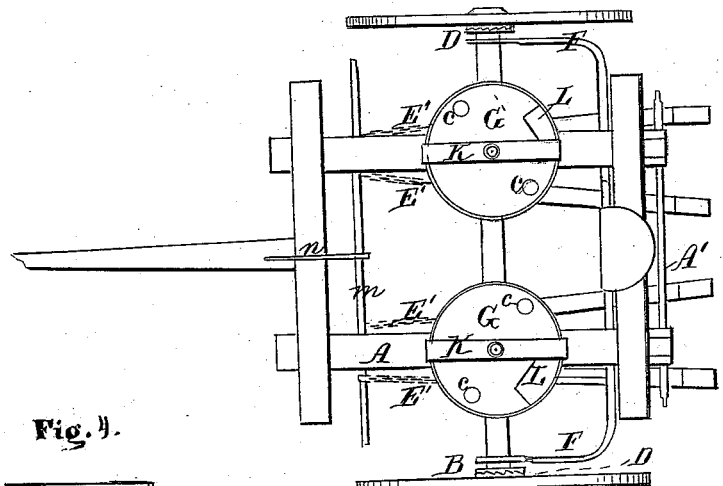
Fig. 1.
Fig. 4.
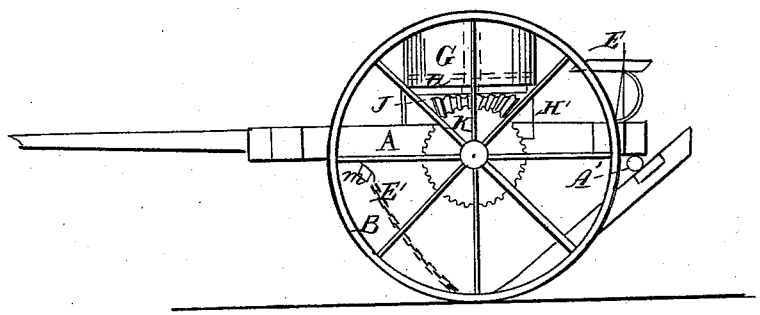
Fig. 2.
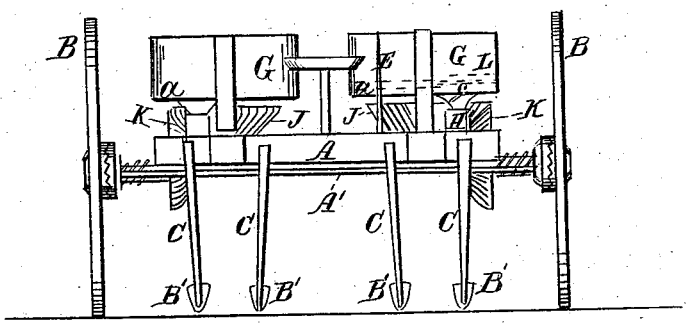
Fig. 3.
Inventor
L. Bartlett
Witnesses
J. H. Burridge
D. D. Humphrey

United States Patent Office.

LORENZO BARTLETT, OF CARDINGTON, OHIO.

Letters Patent No. 94,065, dated August 24, 1869.

IMPROVEMENT IN COMBINED SEEDING-MACHINE AND CULTIVATOR.

The Schedule referred to in these Letters Patent and making part of the same.

*To all whom it may concern:*

Be it known that I, LORENZO BARTLETT, of Cardington, in the county of Morrow, and State of Ohio, have invented certain new and useful Improvements in Seeding-Machine and Cultivator combined; and I do hereby declare that the following is a full, complete description of the same, reference being had to the accompanying drawings, making a part of this specification, in which—

Figure 1 is a top view of the machine.
Figure 2, a side view.
Figure 3, a view of the rear end.
Figure 4, a detached section.

This invention relates to a machine for planting corn and other grain, and for cultivating the soil previous to and after the seeding has been done, thus combining in one implement a seeder and cultivator, as hereinafter more fully described.

In fig. 1, A is a frame mounted upon the wheels B, said wheels being secured to the shaft C, which is operated thereby, by the application of the clutches D, which are made to engage and disengage with the shaft of the wheels as the nature of the work may require, the same being actuated by the lever E, said lever moving the clutches by the intervention of the links F.

On the top of the frame referred to, are secured the seed-boxes G, which are of a circular form, and so arranged that the conductors H, fig. 3, proceeding from the bottom thereof, are about four feet apart, or the distance that the corn is to be planted.

Each box is provided with a supplementary bottom, G', fig. 4, also indicated by the dotted lines $a$, figs. 2 and 3, which, as will be seen, is free to revolve therein by means of a vertical shaft indicated by the dotted lines $b$, figs. 2 and 3. The lower end of said shaft penetrates the bottom of the box, and is keyed to the bevelled gear J, whereas the upper end is sustained by the stay K, projected across the diameter of the box as seen in fig. 1. Said shaft is operated by the corresponding bevel-wheel K, with which it engages, as shown in fig. 3, as and for a purpose hereinafter described.

$c$, fig. 1, are seed-holes or cups, having a capacity to hold from four to six grains of corn. Said cups are made entirely through the supplementary bottom to the bottom of the seed-boxes. Attached to the under side of the supplementary bottom, and immediately under the cups or holes, is a valve, $e$, fig. 4, also indicated by the dotted lines $e$ in fig. 3, which forms the bottom of the cups.

L, fig. 4, is a shield or guard. One end of said shield is raised above the bottom, whereas the opposite end is close down upon it, thereby forming an open mouth at one end and close at the other, the purpose of which will presently be shown.

To the rear end of the machine is hung, on the bar A', a series of plows or shares B', secured to the standards C', and which are so arranged in relation to the tube D' of the seed-boxes as to follow immediately behind them, or they may be adjusted on the bar at any such distance therefrom, and in relation to, as may be required.

Said plows are connected to the front of the frame by the chains F attached to the revolving shaft $m$, whereby they are prevented from being dragged back while in use, and by which they may be raised or lowered, according to the depth that they may be required to run into the ground, by means of the lever $n$, attached to the shaft and operated by the hand of the driver.

Having thus described the construction and arrangement of the seeder, the practical operation of the same is as follows, viz:

The seed is put into the boxes G, and as the machine moves forward in the line of work, the disk or supplementary bottom, G', is made to revolve by the action of the wheels J K. Each cup, as it passes under the shield, also passes over an opening cut in the bottom of the box immediately over the tube or conductor H' at this point. The valve $e$, referred to, drops down, thereby allowing the grain to fall out and into the tube, thence to the ground. The shield covering the cup, prevents more grain than the cupful from falling through, and which, on passing over the opening in the bottom of the box, the valve is closed by being drawn against the opposite edge of the opening. The cup is again filled on emerging from under the lower edge of the shield or guard into the grain. The distance that the cups are from each other, and the time required for each one to come in open relation to the opening in the bottom of the seed-boxes, are so arranged and timed, that the grain will fall from the cup into the tube at the distance of each four feet passed over, and as fast as it falls, it is covered by the plows or shares immediately following.

By this device, two rows of corn are planted at once, at regular and equal distances apart, and covered by the plows referred to; and should it be required to use the machine without the seeding-apparatus, said apparatus can be switched out of gear by the lever and clutches above described, and the plows which may be more or less in number, adjusted for the service of general field-work, or for cultivating in along the rows of corn or other plants that may have been planted in rows.

The depth of the cultivation is regulated by the chains attached to the shares, which, on being wound up on the shaft, raise the plows or lower them as, the case may be.

What I claim as my invention, and desire to secure by Letters Patent, is—

The plows B', shaft $m$, chains E', supplementary bottom G', shield L, and valve $e$, all constructed, and arranged, and combined to operate as and for the purpose substantially as described.

LORENZO BARTLETT.

Witnesses:
J. H. BURRIDGE,
FRANK S. ALDEN.